United States Patent [19]
Takagi et al.

[11] 4,003,030
[45] Jan. 11, 1977

[54] ELECTRONIC CASH REGISTER

[75] Inventors: Haruo Takagi, Muko; Reijiro Aoki, Nagaokakyo, both of Japan

[73] Assignee: Omron Tateisi Electronics Co., Japan

[22] Filed: Sept. 19, 1975

[21] Appl. No.: 614,778

[30] Foreign Application Priority Data

Sept. 25, 1974 Japan .......................... 49-110299

[52] U.S. Cl. .......................... 340/172.5; 235/156; 235/92 CP; 235/92 AC; 235/153 R
[51] Int. Cl.² .......................... G06F 1/00; G06F 3/12; G06F 13/00
[58] Field of Search .......................... 340/172.5; 445/1; 235/92 CP, 92 DP, 92 AC, 152, 156, 168, 153 R, 7 R, 2 R

[56] References Cited
UNITED STATES PATENTS

| | | | |
|---|---|---|---|
| 3,470,538 | 9/1969 | Harbaugh | 340/172.5 |
| 3,748,452 | 7/1973 | Ruben | 340/172.5 |

*Primary Examiner*—Gareth D. Shaw
*Assistant Examiner*—James D. Thomas
*Attorney, Agent, or Firm*—Staas & Halsey

[57] ABSTRACT

An electronic cash register comprising: a power source for energization of said electronic cash register, a power recovery detecting circuit operatively coupled to said power source for detecting the power recovery after occurrence of the power failure, a keyboard for entering numerals and various functions, first price and department code registers for storing the entered price and department code of commodities, respectively, a counter for counting the number of digits of the department code, an adder responsive to the count up output of the counter for providing a cumulative total amount of the prices of the commodities, a total amount non-volatile register for storing the cumulative total amount, a second price and department code non-volatile registers responsive to the count up output of the counter for receiving and storing the price and department code information stored in the first price and department registers respectively, and a printing means responsive to the total, the second price and the second department code registers for printing out the total, price, and department code of the commodities, said printing means being adapted to be responsive to said power recovery detecting circuit for printing out again the datas which were to be printed out before the occurrence of power failure.

36 Claims, 11 Drawing Figures

ELECTRONIC CASH REGISTER

BACKGROUND OF THE INVENTION

1. Field of the Invention

The present invention relates to an electronic cash register. More specifically, the present invention relates to an improved electronic cash register which is adapted to be immune from an inconvenience caused by failure of the power supply therefor.

2. Description of the Prior Art

In a typical prior art electronic cash register, when a customer purchases commodities, the price of each commodity and the code number for identifying the department of each commodity, hereinafter referred to as the department code, are entered by manual operation of numeral keys thereof. These data are stored in respective price and department code storages and each time entry of the price and the department code is completed, for each commodity, the stored data in the said two storages are printed out in a lump. During the consecutive operation of such entries of the price and the department code for each commodity purchased by a given customer, the cumulative total amount of the prices of the respective commodities is obtained for each customer as a result of successive cumulation by means of a summation circuit and is stored in a cumulative total amount storage. After the prices and the department codes of all the commodities purchased by one customer are printed out in order, the cumulative total amount stored in the cumulative total amount storage is printed out in response to a manual operation of a key for instructing the print out thereof.

If and when power failure occurs during the above described consecutive operation of entries of the price and the department code of each of the commodities purchased by the customer, the electronic cash register ceases to operate during the period of the power failure. In such a situation, it is impossible for the operator to know whether the data stored in the said storages which were to be printed out before the power failure were completely printed out. Therefore, it has been a common practice that after the power supply is recovered the data stored in the storages which were to be printed out immediately before the power failure are caused to be printed out again through a repeated entry of the same data of the last entered commodity by a further manual operation.

As described previously, the price and the department code of each of the commodities purchased by the customer are stored in the respective storages and the data stored in these storages are printed out in a lump for each commodity. Also the cumulative total amount is cumulatively stored in a separate storage, throughout the above described entries of the price and department code data, and is printed out by way of a separate step following the print out of the price and the department code data. Therefore, it is desirable, following a power failure and recovery to print out the data which were printed out immediately prior to the power failure. Conventionally, it is necessary for the operator to know which item of those printed out immediately before the power failure, the price and the department code of a particular commodity in a lump or the cumulative total amount, and then to cause the cash register to print out the datas by proper manual operation for selecting the corresponding storage. In addition, the item which is printed out again as described above after the recovery of the power supply is preferably followed by a print out of the letters, for example. RECOVERED immediately after the above described repeated print out in order to allow discrimination of the repeated print out from the print out effected immediately before the power failure. The present invention was achieved in consideration of the above described problems.

SUMMARY OF THE INVENTION

Briefly stated, the present invention comprises an electronic cash register having keying input means for entry of data reflecting the price and the department code of commodities purchased by a customer, a storage for storing said data corresponding to the price, a storage for storing the data corresponding to the department code, means for cumulatively adding the prices of the commodities purchased by the customer and for providing the cumulative total amount thereof, a storage for storing said cumulative total amount, and means responsive to said storages for printing out the data stored therein. The electronic cash register of the present invention further comprises means for detecting recovery of power after power a failure and means responsive to the detected power recovery for enabling the printing means to print out the data stored in the storages which were printed out immediately before the power failure. In a preferred embodiment, of the present invention, the cash register further comprises means for determining which data were printed out immediately before the power failue, data corresponding to the price and the department code of a particular commodity, or the data corresponding to the cumulative total amount.

When the power is restored after a failue has occurred, the power recovery detecting means detects the recovery of the power supply and the detected output enables the printing means to print out the data which were printed out immediately before the power failure along with, the letters such as RECOVERED. Also, in a preferred embodiment, a judgment means determines which data was to be printed out immediately before the power failure, i.e. the data corresponding to the price and the department code of a particular commodity, or the data corresponding to the cumulative total amount. Based, upon the judgement means output, the data stored in the storages which were printed out immediately before the power failure are caused to be automatically printed out again. Since this repeated print out is preferably followed by the above described additional print out of the letters such as RECOVERED, it is possible for an operator to readily discriminate the print out which was repeated after the recovery of the power supply.

Therefore, it is a principal object of the present invention to provide an improved electronic cash register which is immune to data storage loss caused by power failure.

It is another object of the present invention to provide an improved electronic cash register in which the data that was printed our immediately before the power failure are automatically caused to be printed out again in response to recovery of the power supply following a power failure.

These objects and other objects, features, aspects and advantages of the present invention will be better understood when taken in conjunction with the following detailed description and reference to the accompanying drawings.

DESCRIPTION OF THE PREFERRED EMBODIMENTS

Figure 1A:
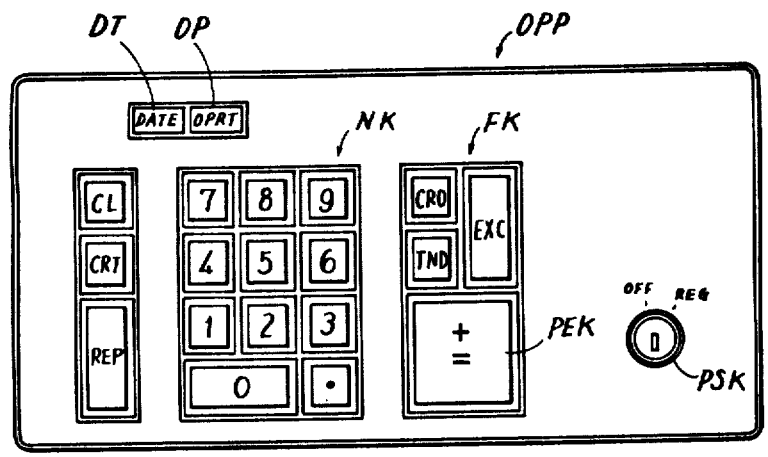
FIG. 1A shows a front view of an operation panel of an electronic cash register in which the present invention can be advantageously employed.
Figure 1B:
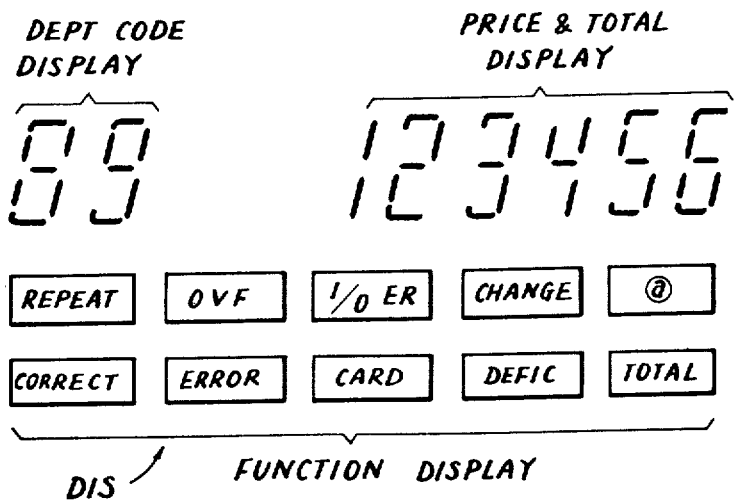
FIG. 1B shows a display panel portion of an electronic cash register.

FIGS. 1A and 1B respectively show a front view of an operation panel and a display portion of an electronic cash register in which the present invention can be advantageously employed.

The operation panel OPP shown, comprises numeral keys, generally identified as NK, bearing indications of numerals 0 through 9 and the decimal point mark on the top surfaces thereof. The numeral keys NK are used for entry of numerical information, such as the price and the department code of a commodity purchased by a customer. Each of the numeral keys NK is associated with a corresponding key switch which is individually coupled to an encoder (not shown) which generates a plurality of kinds of bit serial coded signals in response to depression of each of the numeral keys. Each coded signal uniquely identifies the depressed key of the numeral keys NK. The detailed structure of such numeral keys and the encoder has been well known to those skilled in the art and therefore detailed description thereof is not believed necessary. For the purpose of the present invention, the numeral keys NK further comprise a pulse generator (not shown) which generates a pulse in response to depression of any of the numeral keys NK for indicating the depression of the numeral keys, as to be more fully described subsequently.

The operation panel OPP shown further comprises another group of keys, generally denoted as FK. The keys FK comprises several keys, such as a plus/equal key PEK bearing the symbols ± on the top surface thereof, a credit key bearing the abbreviation CRD on the top surface thereof, a tendered key bearing the abbreviation TND on the top surface thereof, and an exchange key bearing the abbreviation EXC on the top surface thereof. For the purpose of the present invention, the plus/equal key PEK is used to provide a boundary indication between the entry of the price data and the department code data of each commodity, and to provide a command signal for instructing a print out of the cumulative total amount, as is more fully described subsequently.

The operation panel OPP is shown further comprising a power switch key PSK for closing a power supply circuit and for providing a logical signal representaive of closing the power supply circuit, as is more fully described below. The operation panel OPP further comprises an operator key OP and a date key DT, bearing the abbreviations OPRT and DATE, respectively, on the top surfaces thereof. The OP key and DT key are used for entering the operator's identification code and the date, respectively. The operator key OP is described in more detail subsequently. The other keys seen on the operation panel OPP are a clear key CL, for clearing the indication of a display, a correction key CRT, for clearing the data entry for the one commodity just entered and a repeat key for repetitive entry of the one commodity just entered. These keys are well known to those skilled in the art, and are not described in detail.

The display portion DIS shown in FIG. 1B comprises a 2-digit display for displaying the department code of the commodity represented by the 2-digit number in the embodiment shown, and a 7-digit display for allowing display of the numerals of up to 7-digits to display the entered price data of the commodity or the data corresponding the cumulative total amount. Preferably the display portion DIS further comprises several lamp indicators for indicating the present operation state of the equipment, such as repeat as REPEAT, overflow as OVF, input/output error as I/O ER, change as CHANGE, unit price as @ , correct as CORRECT, error as ERROR, credit card as CARD, deficient amount as DEFIC and total as TOTAL. These indications are also well known to those skilled in the art.

Figure 2:
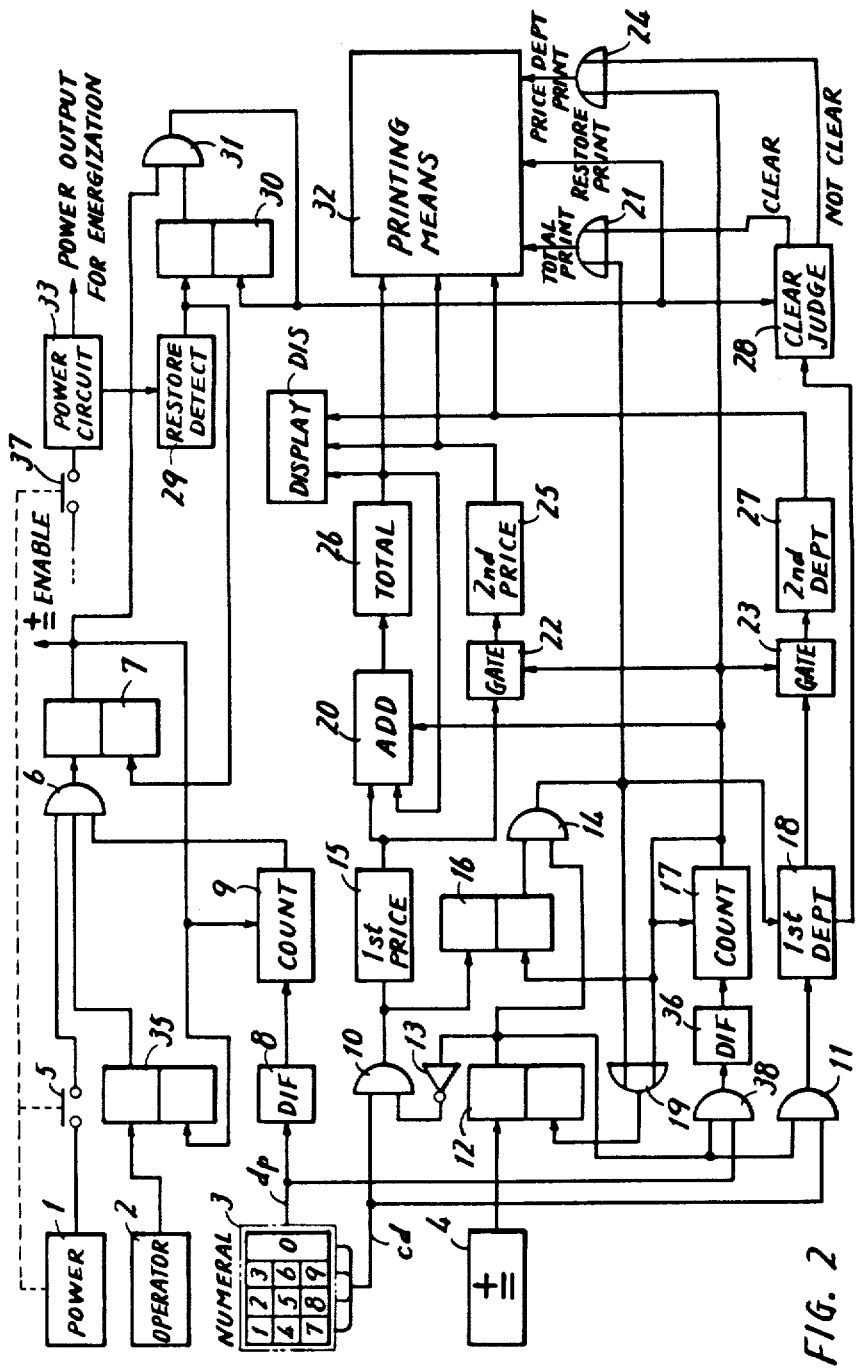
FIG. 2 shows a block diagram of one embodiment of the present invention.

FIG. 2 shows a block diagram of an embodiment of the present invention. The embodiment shown in the diagram includes a power switch key 1, an operator key 2, numeral keys 3 and a plus/equal key 4, which were described with reference to FIG. 1, using the reference characters PSK, OP, NK and PEK, respectively. The output from the numeral keys for representing the depression of any one of the keys is identified as *dp*. The individual outputs, each representing the above described individual bit serial coded signal, are shown generally as a single line, identified as *cd*. The logical output from the power switch key 1 is connected through a switch contact 5 to one input to an AND gate 6. The output from the operator key 2 is connected to the set input of a flip-flop 35 and the set output therefrom is connected to another input to the AND gate 6. The depression indicating output dp from the numeral keys 3 is connected through a differentiation circuit 8 and a counter 9 to a further input to the AND gate 6. The depression indication output dp from the numeral keys 3 is also connected through an AND gate 38 and a differentiation circuit 36 to a counter 17. The output from the plus/equal key 4 is connected to the set input of a flip-flop 12.

The code signal output cd from the numeral keys 3 is connected through an AND gate 10 to a first price register 15. The output of the first price register 15 is connected through an addition circuit 20 to a cumulative total amount register 26, and is also connected through a gate 22 to a second price register 25. The addition circuit 20 has a second input connected to a feed back loop from the output of register 26 for effecting cumulative operation of the prices.

The code signal output cd from the numeral keys 3 is also connected through an AND gate 11 to a first department code register 18, an output of which is connected through a gate 23 to a second department code register 27.

The output from the counter 17 is connected to the addition circuit 20, gate 22 and gate 23 as an enabling signal in order to enable them. The output of counter 17 fed back to the counter itself to provide as a clear signal.

A flip-flop 16 is provided to receive a set input signal from the AND gate 10 and a reset input signal from the output of counter 17. The reset output from the flip-flop 16 is connected to one input of an AND gate 14 and the set output from the flip-flop 12 is connected to another input to the AND gate 14. The set output from the flip-flop 12 is also connected to an individual input at each of the AND gates 38 and 11 and is connected through an inverter 13 to an individual input to the AND gate 10.

The output from the AND gate 14 and the output from the counter 17 are connected through an OR gate 19 to the reset input of the flip-flop 12.

The power switch key 1 is operatively associated with the switch contact 5 and a power switch contact 37 so as to close them during the operation of the cash register. The commercial power line is connected through the power switch contact 37 to a power source circuit 33, in which the alternating current of the commercial power line is rectified and smoothed to provide the usual direct current voltage, which is applied to every part of the cash register for energization thereof.

A power recovery detecting circuit 29 is provided to be operatively associated with the power circuit 33 for detecting the recovery of the power supply after a power supply future occurs. The output from the power recovery detecting circuit 29 indicative of power recovery is applied to the reset input of a flip-flop 7. The output from the AND gate 6 is applied to the set input of the flip-flop 7. The set output from the flip-flop 7 is applied to the plus/equal key 4 as an enabling signal to enable it, is applied to the counter 9 as a disabling signal to disable it, and is further applied to the reset input of the flip-flop 35. The set output from the flip-flop 7 is also connected to one input of an AND gate 31, while the output from the power recovery detecting circuit 29 is connected to the set input of a flip-flop 30 and the set output from the flip-flop 30 is connected to another input to the AND gate 31. The output of the AND gate 31 is connected to the reset input of the flip-flop 30.

A clear judge circuit 28 is provided to detect a cleared state of the first department code register 18, which provides a CLEAR output signal when the register has been cleared and a NOT CLEAR signal output when the register is not cleared. The output from the AND gate 31 is applied to the clear judge circuit 28 as an enabling signal to enable it. The output from the AND gate 14 and the CLEAR output signal from the clear judge circuit 28 are respectively connected to the inputs of an OR gate 21, and the output from the counter 17 and the NOT CLEAR output signal from the clear judge circuit 28 are respectively connected to the inputs of an OR gate 24.

The output from the cumulative total amount register 26, the output from the second price register 25 and the output from the second department code register 27 are respectively connected to both a printing means 32 and a display DIS to provide the cumulative total amount data, the price of the commodity data and the department code data for the commodity for simultaneously printing out and displaying the data. The output from the AND gate 31, the output from the OR gate 21 and the output from the OR gate 24 are connected to the printing means 32 to respectively provide a recovery indication print signal, a cumulative total amount print signal, and a price-department code print signal to enable the printing means 32 in each instance.

For the purpose of the present invention, the cumulative total amount register 26, the second price register 25, the first and second department code registers 18 and 27 are preferably implemented by non-volatile storages, such as core memories, so that the data, once stored, will be kept stored even if a power failure occurs and until the power is recovered.

In operation of the cash register shown, the power switch key 1 is first depressed by the operator, whereby the switch contacts 37 and 5 are operatively closed and held closed during the period of the operation of the register. Upon closing of the switch contact 37, the power source circuit 33 is supplied with the commercial AC power to convert it to the usual DC power, which is fed to electric circuit portions of the cash register, for energization. The closing of the switch contact 5 supplies the high level signal to one input of the AND gate 6. The operator key 2 is then depressed by the operator, whereby the flip-flop 35 is set and the set output of the high level is applied to another input to the AND gate 6. Thereafter the numeral keys 3 are manually operated by the operator to enter the operator code number individually assigned to the operator. Typically, the operator code number comprises four digits of the numerals. Each time one of the numeral keys 3 is depressed to enter each of the four digits of the numerals of the operator code number, an output indicative of depression of one numeral key is obtained at the output dp and another output of bit serial coded signal uniquely identifying the depressed key is obtained at the output cd. The depression indicating output dp is applied to the differentiation circuit 8, thereby to differentiate it. The differentiation output therefrom is applied to the counter 9. The counter 9 comprises a binary counter which is adapted to provide an output therefrom when it counts four incoming pulses commensurate with the number of digits of the operator code number. The differentiation output is counted by the counter 9 and when the entry of the operator code number is completed, a count up output is provided from the counter 9 and is applied to a further input to the AND gate 6. Since the input condition of the AND gate 6 is met, a high level output is obtained from the AND gate 6 and accordingly the flip-flop 7 is set. The set output from the flip-flop 7 is applied to the plus/equal key 4 as an enabling signal, so that the plus/equal key 4 is placed in an enabled condition. The set output from the flip-flop 7 is further applied to the reset input of the flip-flop 35 as a reset signal and to the disable input of the counter 9 as a disabling signal, whereby the flip-flop 35 is reset and the counter 9 is thereafter disabled.

In a preferred embodiment, the bit serial coded signal of the four-digit numerals of the operator code number is input to an operator code number register (not shown) for the purpose of verification of the operator by comparing the similar coded signal stored in advance in a storage (not shown). However, such verification of the entered operator code number is well known to those skilled in the art and is not closely related with the present invention. Therefore, detailed description and illustration for the verification are omitted since they are not necessary for facility of the understanding of the present invention. Now the electronic cash register is ready for the usual registering operation.

when a customer, who wishes to purchase various commodities comes to the operator of the register, the operator starts the registering operation. To that end, the price of the first commodity purchased by the customer is entered using the numeral keys 3. Usually the price of the commodity comprises a variable number of digits of the numerals depending upon the commodities. Entry of the price of the commodity causes the numeral keys 3 to provide a succession of bit serial coded signals, each representative of the numeral of each digit. Since the plus/equal key 4 has not yet been depressed, the flip-flop 12 has been reset, so that at a set output from the flip-flop 12 is the low level and accordingly at a output from the inverter 13 is the high level. Therefore, the above described succession of the bit serial coded signals indicative of the price entered by the keys 3 is loaded through the AND gate 10 to the first price register 15. Assuming that the price of the first commodity purchased is $1.00, the numerals 1.00 are entered by the operator using the numeral keys 3, and therefore the bit serial coded signals of the numerals 1.00 are loaded in the first price register 15. The flip-flop 16 is set by the output from the AND gate 10.

After the entry of the price of the commodity using the numeral keys 3, the plus/equal key 4 is depressed by the operator. The flip-flop 12 is set in response to this operation and the set output therefrom becomes the high level and accordingly the output from the inverter 13 becomes the low level, whereby the AND gate 10 is inhibited from passing therethrough any coded signals insofar as the flip-flop 12 is set. On the other hand the set output of the high level from the flip-flop 12 causes the AND gate 11 to pass therethrough the bit serial code signals from the numeral keys 3 to the first department code register 18. At the next step, the department code of the first commodity is entered by the operator using the numeral keys 3. Assuming that the department code of the first commodity is 01, the numerals 01 are entered. In the embodiment shown, it has been predetermined that the department code number of the commodity comprises two digits of the numerals. The depression indicating signal *dp* is applied through the AND gate 38 enabled by the set output from the flip-flop 12, to the differentation circuit 36 and the differentiation output is applied to the counter 17. The counter 17 comprises a binary counter which provides an output at the count of two incoming signals which correspond to the number of digits of the department code number of the commodity. On the other hand, a succession of the bit serial coded signals of the entered department code number is also allowed to pass through the AND gate 11 to the first department code register 18. Therefore, after completion of the entry of the department code of the commodity, the corresponding coded signal has been loaded in the first department code register 18 and a count up output is obtained from the counter 17. The count up output from the counter 17 enables the gates 22 and 23, whereby the coded signals stored in the first price register 15 and the first department code register 18 are transferred through the corresponding gates 22 and 23 to the second price register 25 and the second department code register 27, respectively. The count up output from the counter 17 also enables the addition circuit 20, whereby the data stored in the first price register 15 and the data stored in the cumulative total amount register 26 which is fed back to another input of the addition circuit 20 (at that time the data stored therein is still zero) are summed and the sum is loaded in the total amount register 26.

The output from the counter 17 is further applied to the OR gate 24, so that the output from the OR gate 24 becomes a high level, which is applied to the printing means 32 as a price/department code print signal. The printing means 32 is enabled in response to the price department code print signal to print out the data corresponding to the department code stored in the second department code register 27 and the data corresponding to the price stored in the second price register 25 in a line. Such data are also displayed by the display DIS. On the other hand, the output from the counter 17 resets the flip-flops 16 and 12. Since one of the inputs to the AND gate 14 is connected from the output from the flip-flop 12 and the other input to the AND gate 14 is connected from the reset output from the flip-flop 16, both inputs to the AND gate 14 do not go to a high level at the same time during the period of the above described operation. Therefore, the output from the AND gate 14 does not become the high level and thus the output from the OR gate 21 does not go to a high level, with the result that no cumulative total amount print signal is obtained.

After the department code number is once entered by means of the numeral keys 3, the flip-flop 12 is reset as described above, so that the AND gates 38 and 11 are disabled, while the output from the inverter 13 goes to high level and enables the AND gate 10.

Figure 3:
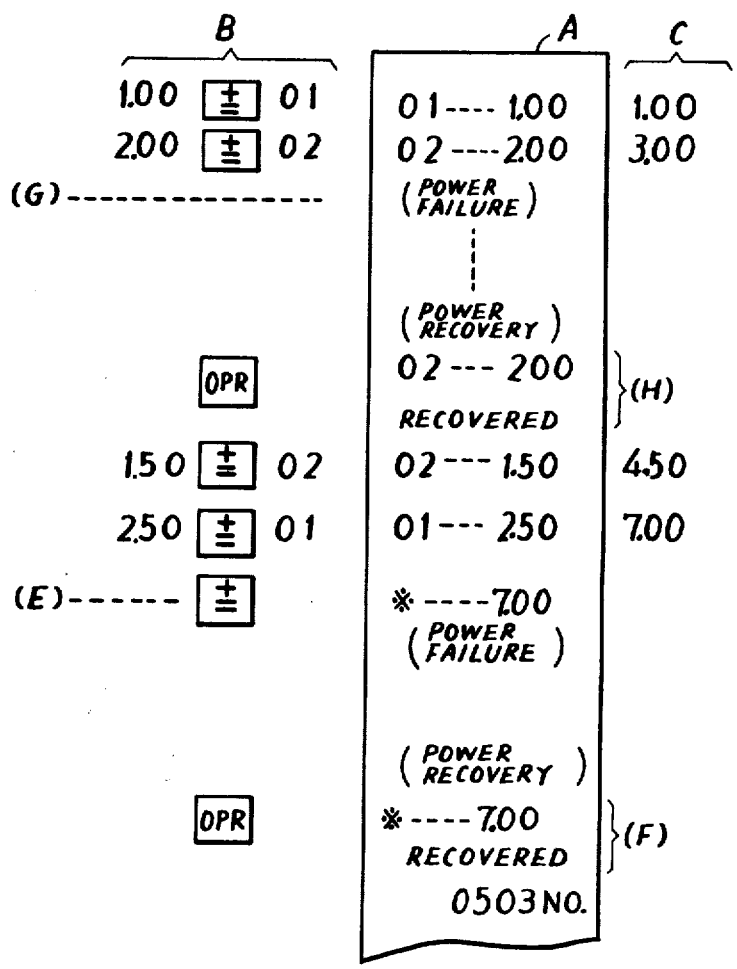
FIG. 3 shows an example of the print out format indicating the manner in which the data appears before and after power failure.

The operation of the novel electronic cash register described in the foregoing and to be described subsequently will be better understood with simultaneous reference to the illustration in FIG. 3, shows the manner of entry of the data and an example of the print out format of the embodiment shown. In FIG. 3, the reference character A shows the print out format printed by means of the printing means 32 in FIG. 2 and the reference character B shows the keys which are depressed for entry of the corresponding data. The entry of the corresponding data and the print out effected in the foregoing description are seen in the first line in the FIG. 3 illustration.

Assuming that the price of the second commodity purchased by the customer is $2.00 and the department code number thereof is 02, the numerals 2.00 are first entered by the numeral keys 3 and the corresponding coded signal is input through the AND gate 10 to the first price register 15. Then the plus/equal key is depressed by the operator, so that the flip-flop 12 is set and the output from the inverter 13 goes to a low level to disable the AND gate 10 while the set output of a high level from the flip-flop 12 enables the AND gates 38 and 11. The cash register is their ready for entry of the department code number of the commodity. When the department code number 2 is entered by the numeral keys, the coded signal of the department code number is input to the first department code register 18 through the AND gate 11, while the depression indicating dpare applied through the AND gate 38 to the counter 17, whereby the count up output is obtained from the counter 17 and enables the gates 22 and 23 to cause the data stored in the first price register 15 and the department code number register 18 to be transferred to the second price register 25 and the second department code register 27, respectively. The output from the counter 17 also causes the OR gate 24 to provide the price/department code print signal, whereby the data stored in the registers 25 and 27 are printed out by the printing means 32. On the other hand, the data so far stored in the cumulative total amount register 26 (at that time, the numeral coded signals corresponding to the numerals 1.00) and the data stored in the first price register 15 (at that time, the coded signals corresponding to the numerals 2.00) are summed up by the addition circuit 20, and the resultant sum of the coded signals corresponding to the numerals 3.00 is input to the cumulative total amount register 26. Referring to FIG. 3, the reference character C shows the data stored in the cumulative total amount register 26 after summation in the addition circuit 20.

The abovedescribed operation is repeated for each of the commodities purchased by the customer. When the price of the last commodity is entered, the plus/equal key is depressed, the department code thereof is entered, and the department code and the price of the last commodity are printed out by the printing means 32, the cumulative total amount of all the commodities purchased by the customer is stored in the total amount register 25. At that time, the flip-flops 16 and 12 have been reset by the count up output from the counter 17. As seen from the foregoing description, until the commodity next to the last, it was the usual step to enter the price of the subsequent commodity after the entry of the department code of the preceding commodity, whereby the flip-flop 16 was set in response to the entry of the price of the subsequent commodity. However, as for the last commodity purchased by the customer, the entry of the department code thereof should be followed by depression of the plus/equal key 4 in the embodiment shown. The depression of the plus/equal key 4 then causes the flip-flop 12 to be set, while the flip-flop 16 has remained as reset in response to the count up output from the counter 17 for the last commodity, as described above. Therefore the output from the AND gate 14 finally goes to a high level, which makes the output from the OR gate 21 goes to a high level, whereby the cumulative total amount print signal is obtained and applied to the printing means 32. As a result, the data concerning the cumulative total amount of the prices of all the commodities purchased by the customer stored in the register 26 is printed out. It is pointed out that the embodiment shown is adapted to automatically print out the asterisk mark * for indicating the sum at the digit position more significant than the print out of the cumulative total amount, as shown in FIG. 3.

Assuming that the amount of money tendered by the purchaser to the operator is exactly the same as the cumulative total amount which means no change, then a key bearing the mark TND is depressed, which causes the printing means 32 to print out the operator's code number, say 0503 and a serial number for receipt, which is shown as NO in FIG. 3. Meanwhile, it should be pointed out that when the output from the AND gate 14 goes to a high level, the first department code register 18 is cleared. More specifically, in such a situation the count up signal has been obtained from the counter 17 to reset the flip-flop 16, thereby to cause the AND gate 14 to provide the high level output, which is applied to the register 18 as a clear signal. This storing state in the department code register 18 is detected by the clear judge circuit 28, as to be more fully described subsequently.

If and when the amount of the money exceeding the printed out cumulative total amount is tendered by the purchaser, the said tendered amount of money is entered using the numeral keys 3, and then the key bearing the indication TND is depressed, whereby the change to be repaid is calculated in the cash register and the tendered amount and the amount of the change are printed out. Since such entry of the tendered amount and calculation of the change to be repaid are well known to those skilled in the art and are not closely related with the present invention, detailed description and illustration therefore are omitted since they are not necessary for an understanding of the present invention.

Now let it be assumed that a power failue occurs in the course of the above described operation. During such a power failure, no direct current power is obtained from the power supply circuit 33 and therefore the electronic cash register ceases to operate. However, as soon as the power is recovered (restored), the direct current power is again provided from the power source circuit 33 and the electronic cash register is again ready again for registering operation. (It is to be pointed out that since the cumulative total amount register 26, the second price register 25, the first department code register 18 and the second department code register 27 are implemented by non-volatile storages, the stored data remain stored therein without being volatilized, even during a power failure.)

Since the power recovery detecting circuit 29 is provided to be operatively associated with the power supply circuit 33, the recovery of the power supply is detected by the circuit 29, as soon as the power is restored. The power recovery detecting signal resets the flip-flop 7, thereby terminating the signal for enabling the plus/equal key 4, and causing the key 4 to be disabled until the flip-flop 7 is again set and the above described enabling signal is obtained. At the same time, the flip-flop 30 is set by the output from the power recovery detecting circuit 29, so that one input to the AND gate 31 goes to a high level.

Upon confirmation of the recovery of the power supply, the operator depresses the operator key 2 and enters the operator code number by the numeral keys 3. The flip-flop 35 is set again in response to the depression of the key 2 to provide the set output of a high level to one of the inputs to the AND gate 6, while the depression indicating pulses are obtained from the numeral keys and after differentiation by the differentiation circuit 8, applied to the counter 9, which provides the count up output of a high level to the remaining input to the AND gate 6. The switch contact 5 is kept closed even during the failure of the power supply, since the switch contact 5 and the key 1 are implemented by a keep relay, for example to apply a high level signal to the AND gate 6. Therefore, the input condition of the AND gate 6 is met and the high level output is obtained therefrom, setting the flip-flop 7 again, enabling the plus/equal key 4, resetting the flip-flop 35 and disabling the counter 9.

It is pointed out that since the flip-flop 7 is connected to be reset in response to the power recovery signal and to be set in response to the depression of the operator key and the entry of the operator code number, the operator is required to enter the operator code number again after power recovery. Therefore, misuse of the cash register can be prevented.

The set output of a high level from the flip-flop 7 is also applied to one input to the AND gate 31. Since the set output of a high level is applied from the flip-flop 30 to another input to the ANd gate 31, the high level output is obtained from the AND gate 31. The output, from AND gate 31 is applied to the printing means 32 as a power restore print signal and is also applied to the clear judge circuit 28 as an enabling signal. The high level output from the AND gate 31 is also applied to the reset input of the flip-flop 30 to reset it.

In response to the high level output from the AND gate 31, the clear judge circuit 28 is enabled to make a decision operation as to whether or not the first department code register 18 has been cleared. If the register 18 has been cleared, the CLEAR output of a high level is obtained and is applied to the OR gate 21, and if the register 18 has not been cleared, NOT CLEAR output of a high level is obtained and is applied to the OR gate 24. If the plus/equal key 4 was depressed immediately after the entry of the department code number, as shown as (E) in FIG. 3, in order to print out the cumulative total amount at the final stage, the output from the AND gate 14 in FIG. 2 went to a high level, so that the first department code register 18 was cleared.

When the clear judge circuit 28 makes a decision that the department code register 18 has been cleared, this means that the plus/equal key 4 was depressed before the occurrence of the failure of the power supply for the purpose of the printing out of the cumulative total amount. Therefore,the CLEAR output is obtained from the circuit 28, in such a situation, so that the output from the OR gate 21 goes to a high level, thereby applying the total amount print signal to printing means 32. Therefore, the printing means 32 prints out the asterisk mark * and the cumulative total amount in response to the output from the OR gate 21 and based on the data stored in the cumulative total amount register 26 and further print out the letters RECOVERED in the subsequent line in response to the output signal from the AND gate 31 and based on the data stored in a register in the printing means (not shown in FIG. 2), the latter being described in more detail subsequently. The reference character F in FIG. 3 shows the print out at this time.

If and when the failure of the power supply occurs before the plus/equal key 4 is depressed, for printing out the cumulative total amount, i.e. in the course of entry of the price and the department code of the respective commodities, then the department code register 18 will not have been cleared. Therefore, when the power supply is restored, in such a situation, the clear judge circuit 28 makes a decision that the department code register 18 has not been cleared, and provides a NOT CLEAR output therefrom, causing the OR gate 24 to apply a high level output to the printing means 32 as a price/department code print signal. Therefore, the printing means 32 prints out the price and the department code in response to the price/department code print signal and based upon the datas stored in the second department code register 27 and the second price register 25, and further prints out in the subsequent line the letters RECOVERED in response to the output from the AND gate 31 and based on the data stored in the register (not shown) to be descried subsequently. This operation is carried out, for example, in the case where a power failure occurs at the moment shown as G in FIG. 3, and the resultant print out is shown as H in FIG. 3.

Generally, it could happen that the data so far stored in the registers 26, 22 and 27 have not been completely printed out at the time of occurrence of a power failure. According to the embodiment shown, however, the datas which were to be printed out immediately before the power failure are printed out again after the power is restored, and is followed by the additional print out of the letters RECOVERED for the purpose of indicating the reprint after the power recovery.

The final print 0503 NO as shown in FIG. 3 is the number of the operator and the serial number of the receipt. The print out of such numbers has also been well known to those skilled in the art and detailed explanation therefore is omitted.

In general, manual entry of various data using various keys is rather time consuming, while a print out operation of one line in the print out format, by means of the printing means 32, is effected within a rather short time. On the other hand, it is well known that the power supply circuitry of electronic equipment usually has a supply voltage continuing characteristic which maintains the electronic equipment in an operating condition for a few seconds after interruption of the power supply. Thus, in an electronic cash register the data stored in the second price registers 25 and the second department code register 27 immediately before the power failure are continuously printed out due to the above described power voltage continuing characteristic even after the power failure, although another registering operation has become impossible. However, this could entail another problem as discussed in the following.

As is often the case with a cash register, a customer often purchases several of the same commodities at one time. According to the FIG. 2 embodiment, the print out of the department code number and the price of the commodity is repeated several times in the print out format for the customer who purchased the several same commodities at one time. Assuming that a power failure occurs in the course of the repeated print out of the same department code and the price of the commodity, the data stored in the price register 25 and the department code register 27 immdiately before the power failure are printed out after the power recovery followed by an additional print out of the letters RECOVERED. IN such a situation, a further repeated entry of the data and the repeated print out are then continued, following the above described print out accompanied by the letters RECOVERED. However, in such a situation, it can happen that the data stored in the registers 25 and 27 immediately before the power failure have been continuously printed out by the above described source voltage continuing characteristic of the power supply for a little while after the occurrence of the power failure. Thus, the operator can not know whether the data stored in the registers 25 and 27 immediately before the power failure were printed out soon thereafter by the above described source voltage continuing characteristic of the power supply and the same data were again reprinted after the power recovery followed by the letters RECOVERED, or the data stored in the registers 25 and 27 immediately before the power failure were not printed out immediately thereafter and were printed out for the first time by way of the print out after the power recovery together with the letters RECOVERED, because of repetition of the print out of the same department code number and the price of the commodity, in this particular situation. Thus it is desired that an electronic cash register be provided which is capable of providing such discrimination even in the case of repeated print out of the same department code and the price of the commodities.

Figure 2A:
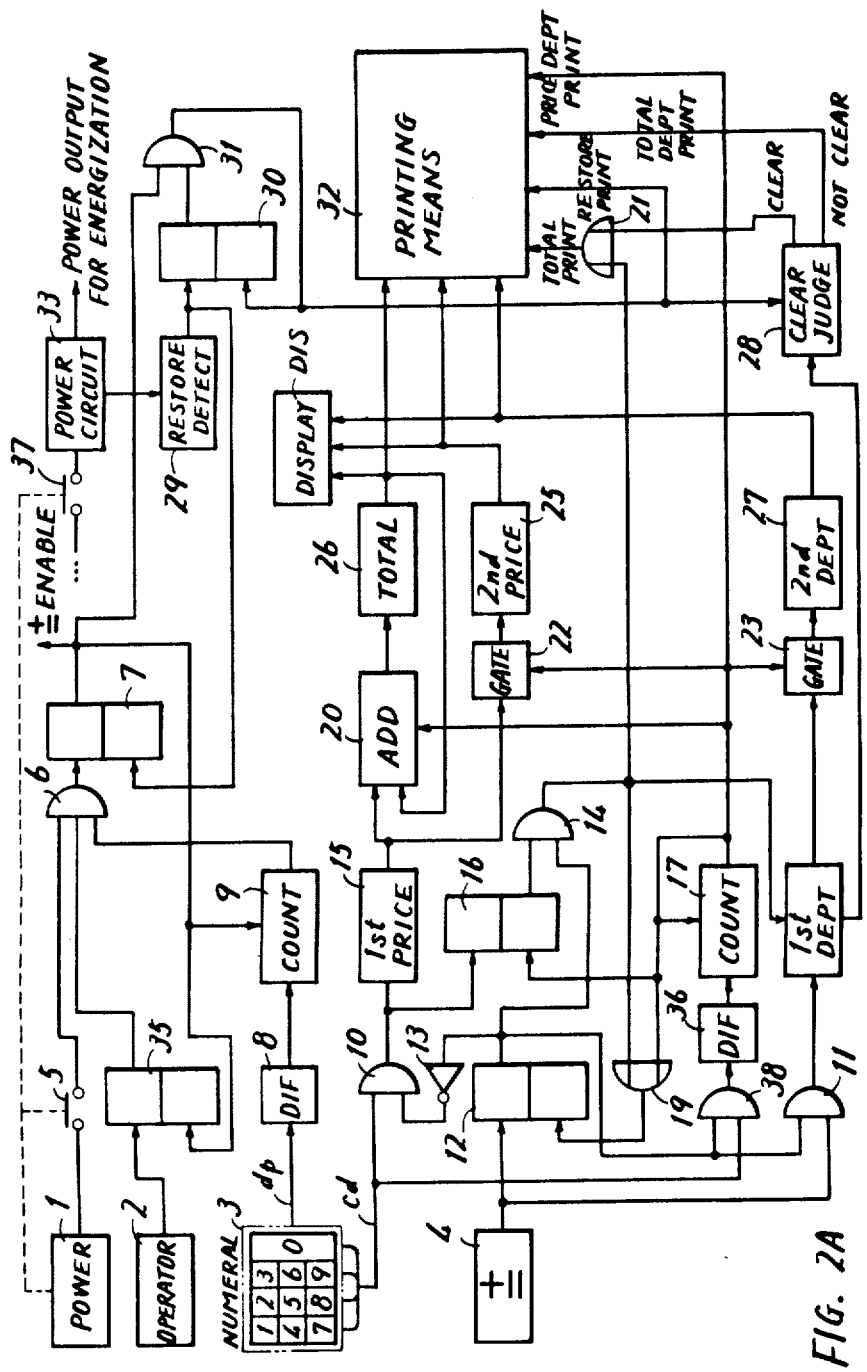
FIG. 2A shows a block diagram of a preferred embodiment of the present invention which comprises an improvement for eliminating a problem encounted in the repeated print out of the same data.

FIG. 2A shows a block diagram of a preferred embodiment of the present invention which comprises an improvement for eliminating the above described problem encountered in the repeated print out of the same data. Since the major portion of the FIG. 2A embodiment is the same as that of the FIG. 2 embodiment, only the modified portion will be described in detail in the following, while the same reference characters are used in the said major portion of the FIG. 2A embodiment. With particular reference to the right lower portion of FIG. 2A, the NOT CLEAR output signal obtainable from the clear judge circuit 28 is applied directly to the printing means 32 as a cumulative total amount/department code print signal. Accordingly, it is necessary to modify the printing means 32 so as to print out the cumulative total amount and the department code of the commodity in response to the cumulative total amount/department code print signal and based on the data stored up to the power failure in the cumulative total amount register 26 and in the second department code register 27. According to the FIG. 2A embodiment, upon recovery of the power supply after the power failure, the cumulative total amount of the commodities, as entered up to the occurrence of the power failure, is printed out instead of the price of the commodity entered immediately before the power failure in the FIG. 2 embodiment. Therefore, the operator can readily discern from the cumulative calculation which commodity has already been printed out in the print out format. This is particularly advantageous in the repeated print out of the same department code and the price of the commodity, which is encountered in case of the purchase by a customer of the several same commodities at one time.

Figure 4:
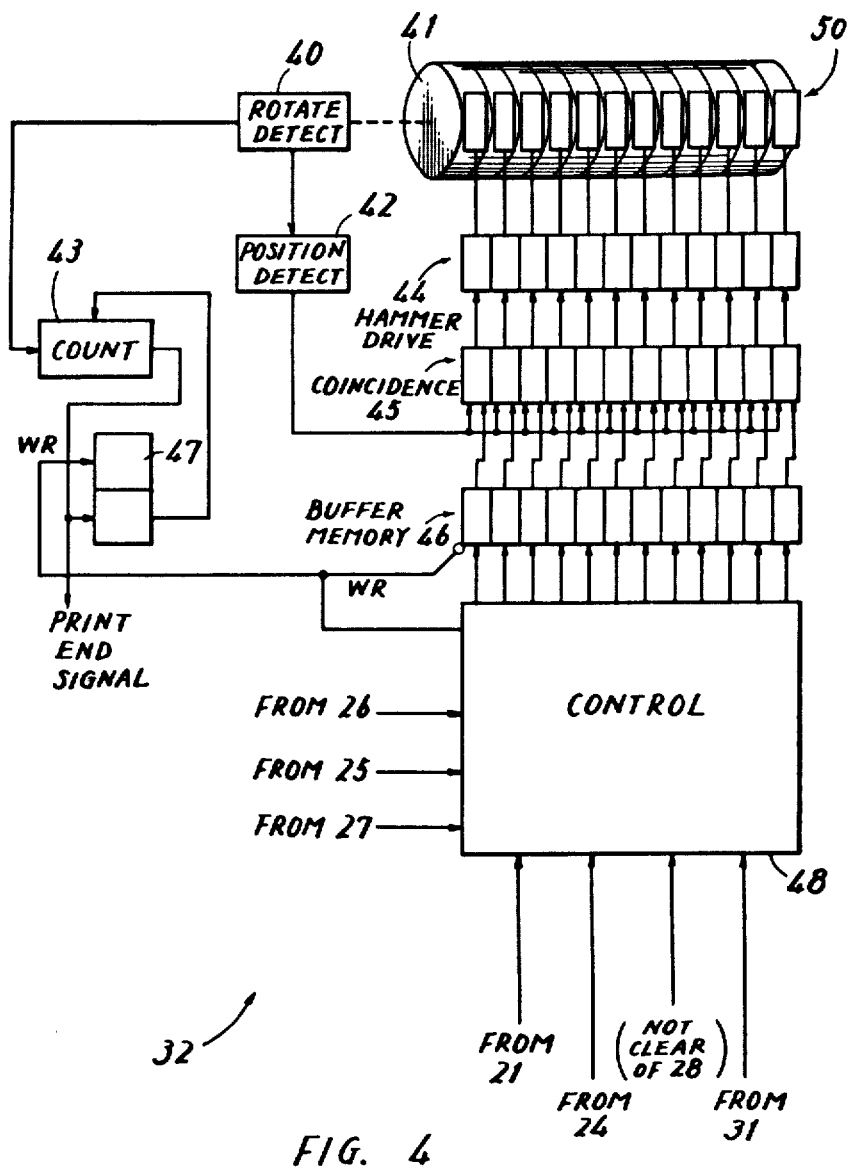
FIG. 4 shows detailed a block diagram of the printing means 32 shown in FIGS. 2 and 2A.

FIG. 4 illustrates a block diagram of only the printing means 32 shown in FIG. 2A. The printing means 32 comprises a control circuit 48 which is adapted to receive the data stored in the second department code register 27, the second price register 25 and the cumulative total amount register 26. The control circuit 48 also receives signals from the OR gate 21 as the cumulative total amount print signal, from the OR gate 24 as the price/department code print signal, from the AND gate 31 as the recovered print signal and from the circuit 28 as the total/department code print signal. In the embodiment shown, the control circuit 48 is further adapted to generate a code signal necessary for printing out the indication of the letters RECOVERED, as is more fully described subsequently. The printing means 32 shown in FIG. 4 comprises a well known line printer operable in response to the output from the above described control circuit 48. More specifically, the line printer comprises a print drum 41, which comprises a plurality of digit positions separated in the axial direction thereof, each of the digit positions comprising a font of the types necessary for printing out the numerals 0 through 9 and some additional symbols arranged along the peripheral surface of each disk peripheral surface of each digit position, such that the corresponding types of the respective digit positions are aligned in the horizontal direction. The print drum 41 is rotated by a suitable prime mover (not shown) and the rotation thereof is detected in the form of pulses by a rotation detecting means 40 operatively coupled to the shaft of the print drum. Typically the font of the types provided at each digit position of the print drum 41 comprises 16 types. Therefore, the pulse output from the rotation detecting means 40 is applied to a counter 43, which provides a count up output when it counts 16 pulses from the rotation detecting means 40. The count up signal is applied to a reset input of a flip-flop 47 and is also withdrawn as a print end signal, as to be more fully described subsequently. The output from the rotation detecting means 40 is also applied to a drum position detecting means 42, which provides in succession a code signal (in terms of the same coding convention as that of the datas stored in the registers 25, 26 and 27) indicative of the position of the type which faces a set of hammers 50 each time each type comes to face the hammers 50. A plurality of hammers 50 each corresponding to the digit position of the print drum are provided so as to be faced to the type position when the above described type position signal is obtained from the drum position detecting means 42. These hammers are individually coupled to the respective hammer drivers 44 such that each hammer can be driven independently of each other in response to an individual drive signal to be described subsequently. Such plurality of individual drive signals are obtained from the plurality of stages of a coincidence detecting circuit 45. Each stage of the coincidence detecting circuit 45 has one input connected commonly to the output of the drum position detecting means 42 and the other input connected individually to each stage of a buffer memory 46. The buffer memory 46 is enabled in response to a write signal WR generated in response to the above described print signals to write in a cooridinated signal individually provided by the control circuit 48. The control circuit 48 generates such coordinated signals in response to one of the print signals, (i.e. the cumulative total amount, the price/department code, the total/department code and the recovery), based on the coded signals stored in the registers 26, 25 and 27 and another register representative of the cumulative total amount, the price, the department code and the recovery code, respectively. It is understood that such coordinated signal should comprise a code signal indicative of the position of the type to be printed out in terms of the same code signal as obtainable from the means 42.

In operation, each time one of the print signals (i.e., the cumulative total amount from the OR gate 21, the price/department code from the circuit 28 and the recovery from the AND gate 31) is received, the relevant datas stored in the registers 26, 25 and 27 are allowed to be input in a code signal coordinator (not shown) in the control citcuit 48. The data input to the coordinator is coordinated into a code signal representative of a position of the types in the print drum 41 per each digit of the print drum and the individual coded signals are individually withdrawn from the coordinator and thus from the control circuit 48. On the other hand, the write signal output WR is obtained in response to one of the print signals and applied to the buffer memory 46 to cause the buffer memory to write-in the coordinated output from the control circuit 48 for each digit position, while the same write signal WR is applied to the set input of the flip-flop 47, thereby to set it.

As the print drum 41 rotates, the code signal indicative of the position of the type facing the line of the hammers 50 is applied to one input of each stage of the coincidence detecting circuit 45. On the otherhand the above described individual coordinated signal at each digit position is individually applied to other input of each stage of the coincidence detecting circuit 45. Therefore, only when both inputs of each stage of the coincidence detecting circuit 45 coincide with each other, the coincided output is individually obtained from each corresponding stage or digit position and is applied to the corresponding stage of the hammer driver circuit 44. As a result, the hammer in each corresponding stage is individually driven toward the surface of the print drum 41, when the type of the font in the corresponding digit position has been placed in front of the hammer 50 in synchronizm with the driving of the hammer, with the result that the desired character is printed out in the desired digit position for each digit throughout one line of the print out while the print drum makes one full rotation. At the end of one full rotation of the print drum 50, the counter 43 provides a count up output, which is applied to the reset input of the flip-flop 47 to reset it, whereby the counter 43 is reset by the reset output of the flip-flop 47 and the printing means 32 returns to the original state. The said count up output of the counter 43 is withdrawn as a print end signal to be described subsequently.

Figure 4A:
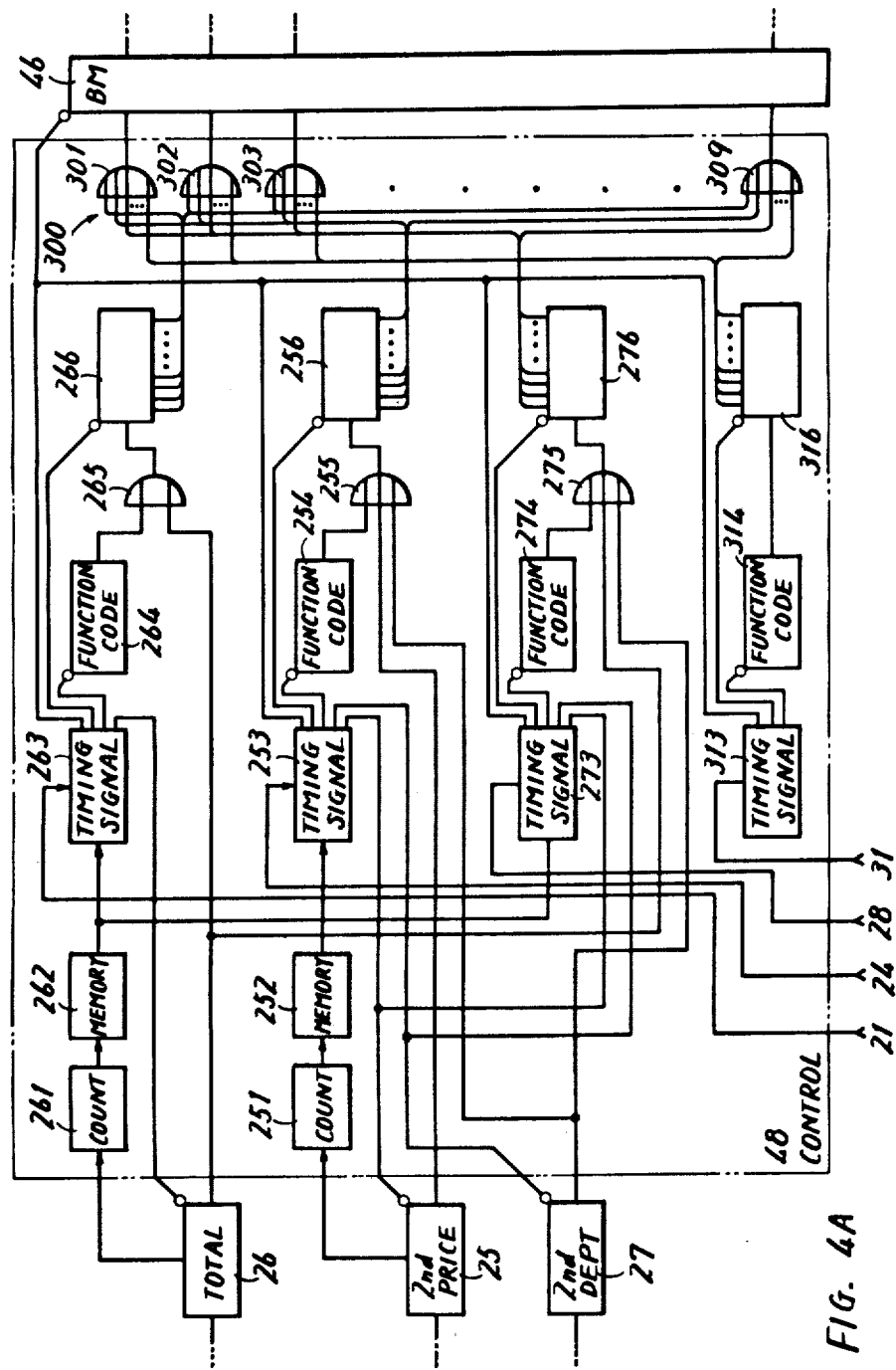
FIG. 4A shows a detailed a block diagram of the control circuit 48, shown in FIG. 4.

FIG. 4A shows a block diagram of the control circuit 48, shown in FIG. 4. The control circuit 48 comprises a digit number counter 261 connected to the cumulative total amount register 26 for counting the number of digits of the cumulative total amount stored in the register 26, a non-volatile memory 262 for storing the number of digits counted by the counter 261, a timing signal generator 263 connected to be enabled by the output from the OR gate 21 to receive the output of the memory 262 for generating various timing signals. One of the timing signals is applied to the register 26 as a read-out shift pulse. Another timing signal is applied to a function code generator 264 which generates, in response to the read-out timing signal, a set of code signals including a code signal indicative of the asterisk mark *, for indicating the cumulative total amount, to be positioned at the most significant digit position and subsequent code signals indicative of the dot mark to be positioned at the subsequent less significant digit positions. The number of dot marks are determined by the number of digits of the total amount in the register 26 so as to cover the digit positions other than the most significant digit position for indicating the said asterisk mark and several digit positions from the least significant digit position for indicating the cumulative total amount. The outputs of the function code generator 264 and the register 26 are connected through an OR gate 265 to a shift register 266 for storing a coordinated composite code signal comprising the code signal for the said asterisk mark at the most significant digit position, the code signals for the total amount at the lesser significant digit positions and the code signals for the dot marks at the remaining intermediate digit positions. One of the timing signals from the timing signal generator 263 is applied to the shift register 266 as a load or write-in shift pulse.

Another set of a digit number counter 251, non-volatile memory 252, a timing signal generator 253, a function code generator 254, an OR gate 255 and a shift register 256 is provided, which is similar to the above described set of the blocks 261, 262, 263, 264, 265 and 266, respectively. However, the following difference is observed therebetween. The counter 251 is adapted to count the number of digits of the price of each commodity as stored in the register 25. The function code generator 254 is adapted to generate only the dot mark. The timing signal generator 253 is adapted to generate the read-out shift pulses to the price register 25 and the department code register 27 such that the department code is the register 27 is read out so as to be positioned toward the most significant digit position and the price stored in the register 25 is read out so as to be positioned toward the least significant digit position, while the function code is made to be generated so as to be positioned at the remaining intermediate digit positions. The OR gate 255 is connected to receive the outputs from the function code generator 254, the price register 25 and the department code register 27. Thus, it is seen that the shift register 256 stores the coordinated composite code signal as obtained from the OR gate 255 as described above.

The control 48 comprises a further set of a timing signal generator 273, a function code generator 274, an OR gate 275 and a shift register 276, which is partly similar to both of the above described two sets of the like components. More specifically, the timing signal generator 273 is adapted to be enabled by the NOT CLEAR output of the clear judge circuit 28 to receive the output from the memory 262. The OR gate 275 is connected to receive the outputs from the function code generator 274, the cumulative total amount register 26 and the department code register 27. The timing signal 273 is adapted to generate the read-out shift pulses such that the department code is read out from the register 27 so as to be positioned toward the most significant digit position, the cumulative total amount is read out from the register 26 so as to be positioned toward the least significant digit position while the function code is generated so as to be positioned at the remaining intermediate digit positions. The shift register 276 is thus adapted to store the coordinated composite code signal as thus read out.

The control circuit 48, shown further, comprises still another timing signal generator 313, a function code generator 314 and a shift register 316. The timing signal generator 313 is adapted to be enabled by the output from the AND gate 31 to generate a read-out signal to be applied to the function code generator 314, which generates the code signal indicative of the letters RECOVERED, for example, which should be printed out by the line printer shown in FIG. 4. Accordingly, the line printer is also adapted to comprise the types for the letters RECOVERED from the most significant digit position to the least significant digit position at the same rotational position of the print drum 41 by way of an exception to the arrangement of the types of the font at each digit position of the print drum 41. Therefore, the code signal of each digit position for indicating the letters RECOVERED is the same throughout the whole word and therefore the shift register 316 stores a combination of the same code signal.

Each of the registers 266, 256, 276 and 316 is connected in a bit parallel fashion through a set 300 of OR gates 301, 302, 303 . . . 309 to each of the corresponding nine digit positions of the buffer memory 46. The timing signal generators 263, 253, 273 and 313 are further adapted to generate a write-in or load signal to be applied to the buffer memory 46 thereby to effect the write-in of the output from the register 266, 256, 276 or 316.

In operation, in response to the output from the OR gate 21, the timing signal generator 263 is enabled to receive the number of digits of the cumulative total amount stored in the register 26 and to generate the timing signals such that the code signal of the cumulative total amount is first read out from the register 26 starting from the least significant digit. The code signals for the dot mark are then generated at the subsequent digit positions from the function code generator 264 and then the code signal of the asterisk mark * is generated at the most significant digit position. This set of code signals is loaded, as a function of the write-in shift pulse, into the shift register 266 in the form of the coordinated composite code signal. Thereafter another write-in shift pulse is obtained from the timing signal generator 263 to cause the composite code signal to be loaded in the buffer memory 46 on the bit parallel basis. Since the composite code signal comprises the code signal indicative of the position of the corresponding type in the printer drum 41, at each digit position, print out is carried out independently for each digit position to print out the combination of the asterick mark, the dot marks and the cumulative total amount from the most significant digit position toward the least significant digit position, as shown as E in FIG. 3.

When the output is obtained from the OR gate 24, the timing signal generator 253 is enabled to perform an operation similar to generator 263, above. In this case, however, the price code signal is first read out so as to be positioned toward the least significant digit position. Then, the dot mark code signal is generated so as to be positioned at the intermediate digit positions and the department code is read out so as to be positioned toward the most significant digit position. As a result the shift register 256 stores the combination of the code signals of the department code, dot marks and the price of each commodity. Print out is effected accordingly, as shown in the corresponding portions in FIG. 3.

The set of the blocks 273, 274, 275 and 276, in FIG. 4A, is for the FIG. 2A embodiment. To that end the timing signal generator 273 is adapted to be enabled by the NOT CLEAR output of the clear judge circuit 28 to generate timing signals such that the register 276 stores the combination of the code signals of the department code, the dot marks and the cumulative total amount so far obtained at the time when the NOT CLEAR output signal is obtaied from the clear judge circuit 28. Therefore, the corresponding print out can be effected accordingly.

When the output is obtained from the AND gate 31, the timing signal generator 313 is enabled to make the function code generator 314 generate the code signals for the particular rotational position of the print drum in which the types of the letters RECOVERED are mounted in the order of the digits. As a result, the shift register stores the combination of the code signals of the common rotational position for each digit position and the print out is effected by the line printer to print out the above described exceptionally prepared types of the font for the letters RECOVERED in a line.

Figure 5:
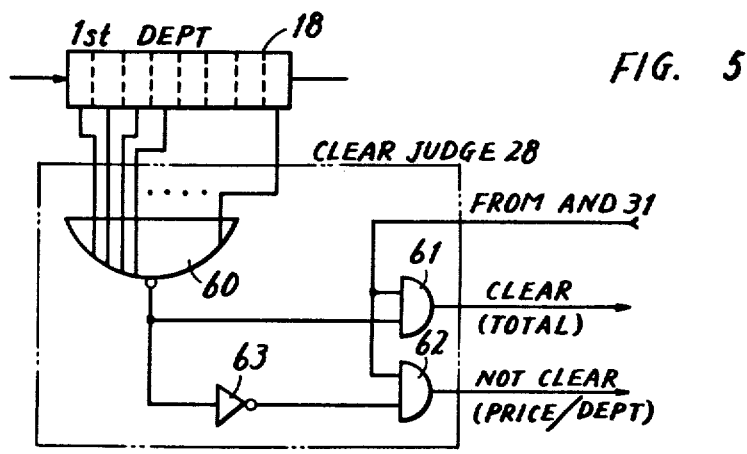
FIG. 5 is a schematic diagram of the clear judge circuit 28 shown in FIGS. 2 and 2A.

FIG. 5 is a schematic diagram of the clear judge circuit 28 shown in FIGS. 2 and 2A. As described previously, the clear judge circuit 28 determines whether the first department code register 18 has been cleared or not. Referring to FIG. 5, the clear judge circuit 28 comprises a NOR gate 60, each input of which is individually connected to each cell of the first department code register 18 to provide a high level output from the gate 60 only if and when the first department code register 18 has been cleared. The output from the NOR gate 60 is directly applied to one input of an AND gate 61 and through an inverter 63 to one input of an AND gate 62, while the recovery signal obtainable from the AND gate 31 is applied to the other inputs of the AND gates 61 and 62. As described previously, when the first department code register 18 has been cleared and the recovery signai is obtained from the AND gate 31, a high level output, (previously to as the CLEAR signal), is obtained from the AND gate 61 and is applied to the printing means 32 as the cumulative total amount print signal. When the first department code register 18 has not been cleared and the recovery signal is obtained from the AND gate 31, a high level output, (previously referred to as the NOT CLEAR signal) is obtained from the AND gate 62 and is applied to the printing means 32 as the price (or total)/department code print signal.

Figure 5A:
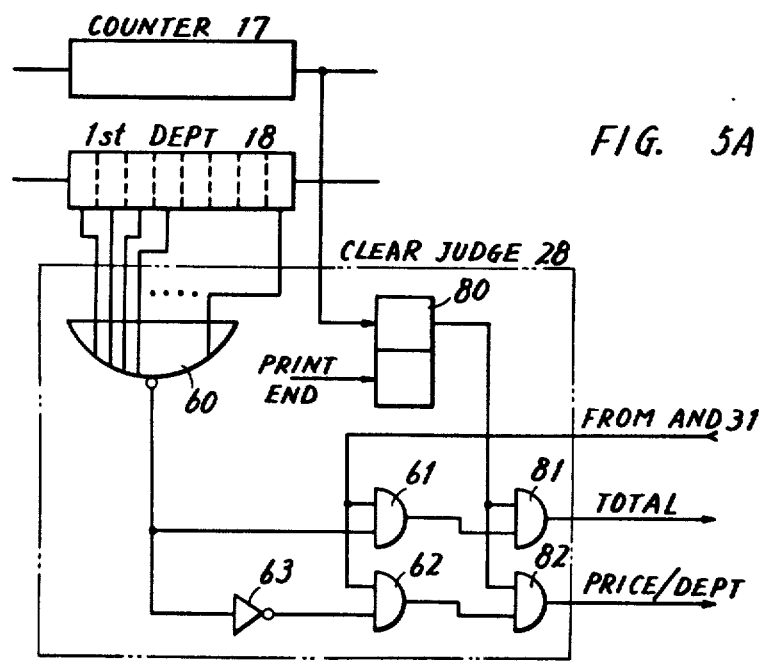
FIG. 5A is similar to FIG. 5, but shows a block diagram of another preferred embodiment of the clear judge circuit 28.

FIG. 5A is similar to FIG. 5 but shows a block diagram of a preferred embodiment of the clear judge circuit 28. More specifically, the output from the AND gates 61 and 62 are connected through AND gates 81 and 82 to the OR gates 21 and 24, respectively, while one input of the AND gates 81 and 82 are connected from the set output of a flip-flop 80. The set input of the flip-flop 80 is connected to the count up output of the counter 17 and the reset input of the flip-flop 80 is connected to receive the print end signal in the printing means 32 shown in FIG. 4. Thus it is seen that in the FIG. 5A embodiment the outputs from the clear judge circuit 28 shown in FIG. 5 are adapted to be conditioned as a function of the set output of the flip-flop 80. Since the count up output is obtained from the counter 17 at the end of the entry of all the data concerned in one commodity and thus all the data to be printed out in a single line and the print end signal is obtained at the end of the printing operation of each line by the printing means 32, the FIG. 5A embodiment enables the output of the clear judge circuit 28 selectively only in the period from the end of the entry of one line data to the end of the print out of one line data.

Assuming that a power failure occurs during the period of time when an output is obtained from the flip-flop 80 (i.e., from the end of the entry of the data of one commodity to the end of the print out of the corresponding data), there is a high probability that the data entered and stored in the registers 26, 25 and 27 was not printed out at the time of occurrence of the power failure and therefore it is necessary to again print out the data stored in the registers 26, 25 and 27, together with the print out of the letters RECOVERED. On the other hand, even if a power failure occurred while the flip-flop 80 is reset, there is high probability that the data once entered and stored in the registers 26, 25 and 27 was printed out until immediately after the occurrence of the power failure and therefore it is not necessary to print out again the same datas which were printed out already, in a particular application of the electronic cash register. To that end the FIG. 5A embodiment is aimed to restrict the circumstance in which the data stored in the registers 26, 25 and 27 are printed out again after the power is recovered. Since any repeated print out of the same data for the same commodity is avoided in any situation, the FIG. 5A embodiment is particularly advantageous in the applications of the cash registers for making a daily report, for example.

Figure 6:
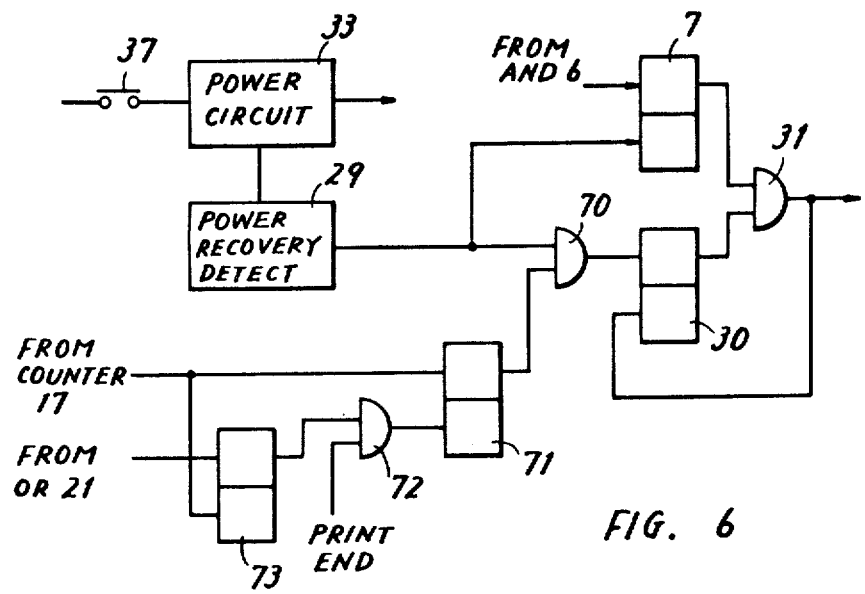
FIG. 6 is a schematic diagram of an improvement in the power recovery signal generating circuit shown in the FIG. 2 and FIG. 2A embodiments, comprising a flip-flop 7, the a power recovery detecting circuit 29, a flip-flop 30 and an AND gate 31.

FIG. 6 is a schematic diagram of an improvement in the recovery signal generating circuit in the FIGS. 2 and 2A embodiments comprising the flip-flop 7, the power recovery detecting circuit 29, the flip-flop 30 and the AND gate 31. More specifically, it could happen that the power recovery detecting circuit 29 is responsive to even the initial turning on of the power supply to provide an output therefrom, depending upon the circuit design of the power recovery circuit 29. It is preferred that such an operation of the power recovery detecting circuit 29 responsive to initiation of the power supply is avoided so far as it is possible. To that end, the FIG. 6 embodiment comprises an AND gate 70 inserted between the output of the power recovery detecting circuit 29 and the set input of the flip-flop 30, the other input of which is connected from the set output of a flip-flop 71. The set input of the flip-flop 71 is connected from the count up output of the counter 17, while the reset input of the flip-flop 71 is connected from the output from an AND gate 72. One input of the AND gate 72 is connected from the set output of a flip-flop 73 and the other input of the AND gate 72 is connected to receive the above described print end signal obtainable from the counter 43 of the printing means 32 shown in FIG. 4. The set input of the flip-flop 73 is connected from the output of the OR gate 21 and the reset input of the flip-flop 73 is connected from the count up output of the counter 17.

Figure 7:
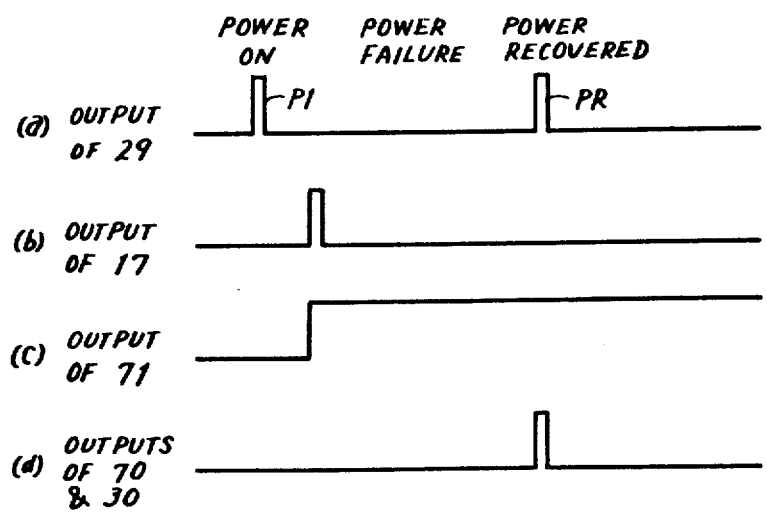
FIG. 7 shows the wave forms of the signals at various points in the FIG. 6 embodiment.

The operation of the FIG. 6 embodiment is better understood by referring to the illustration in FIG. 7, which shows the wave forms of the signals at various points in the FIG. 6 embodiment. As described previously, the power recovery detecting circuit 29 could provide a pulse PI in response to the initiation of the power supply and also the pulse PR in response to the power recovery, as shown in FIG. 7(a). After the initiation of the power supply, the usual registering operation is started. It is understood that the count up output is obtained from the counter 17 for the first time since the initiation of the power supply when the department code of the first commodity of the customer is entered, as shown in FIG. 7(b). As a result, the flip-flop 71 is set, as shown in FIG. 7(c), thereby to enable the AND gate 70. Thus, the recovery signal output obtainable from the circuit 29 is allowed to pass through the AND gate 70 only thereafter, as shown in FIG. 7(d). As a result, any responsive operation of the power recovery detecting circuit by the initiation of the power supply can be avoided according to the FIG. 6 embodiment.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. An information output apparatus in an electronic information processing system, comprising;
   means for supplying electric power to said electronic information processing system for energization thereof,
   means operatively coupled to said power supplying means for detecting recovery of said power supply means after the occurrence of a power failure, and outputing a power recovery detection signal
   means for storing information to be printed out,
   means responsive to said power recovery detection signal output from said power recovery detecting means for issuring a print enabling signal and
   means responsive to said print enabling signal for printing out said information stored in said storing means.

2. An electronic cash register, comprising;
   means for supplying electric power to said electronic cash register for energization thereof,
   means operatively coupled to said power supply means for detecting recovery of the power supply after the occurrence of a power failure and producing a corresponding power recovery detected output signal,
   means for entering information concerning commercial transactions to said electronic cash register,
   storage means connected to said entering means for storing said entered information,
   means responsive to said power recovery detected output signal from said power recovery detecting means for issuring a print enabling signal, and
   means responsive to said print enabling signal for printing out said information stored in said storage means.

3. An electronic cash register in accordance with claim 2, in which said storage means comprises
   first storage means responsive to an output from said entry means for storing said information concerning commercial transactions, and
   second storage means for storing information transferred from said first storage means.

4. An electronic cash register in accordance with claim 3, in which said second storage means comprises a non-volatile memory.

5. An electronic cash register in accordance with claim 3, in which said informaton comprises a plurality of information pieces to be entered in succession, and which further comprises
   means for providing a transfer signal indicative of the loading of each information piece in said first storage means, and
   means responsive to an output of said load indicating signal providing means for transferring said information piece stored in said first storage means into said second storage means.

6. An electronic cash register in accordance with claim 5, in which said information piece comprises a predetermined number of digits, and said load indicating signal providing means comprises means for counting the number of digits of each said entered information piece.

7. An electronic cash register in accordance with claim 5, said load indicating signal providing means is connected to said transfer means and produces a transfer signal causing said transfer means to transfer said information stored in said first storage means into said second storage means.

8. An electronic cash register in accordance with claim 5, in which each of said information pieces comprises a price information constituent representative of the price of said commercial transactions and a department information constituent representative of the department of said commercial transactions.

9. An electronic cash register in accordance with claim 8, in which said first storage means comprises first price storage means and first department storage means.

10. An electronic cash register in accordance with claim 9, which further comprises means coupled to said entry means for selectively feeding the price constituent output from said entry means to said first price storage means and the department constituent output from said entry means to said first department storage means.

11. An electronic cash register in accordance with claim 10, in which said second storage means comprises second price storage means coupled to said first price storage means and second department storage means coupled to said first department storage means.

12. An electronic cash register in accordance with claim 11, in which said transfer means comprises means for transferring said price information constituent stored in said first price storage means into said second price storage means and for transferring said department information constituent stored in said first department storage means into said second department storage means.

13. An electronic cash register in accordance with claim 12, in which said load indicating signal providing means is connected to said transfer means and produces a transfer signal when said information is loaded in said first storage means.

14. An electronic cash register in accordance with claim 12, in which said department information constituent comprises a predetermined number of digits, and said load indicating signal providing means comprises means for counting the number of digits of each said entered department information constituent of said entered information piece.

15. An electronic cash register in accordance with claim 12, in which said printing means comprises means responsive to said transfer signal for printing said price information constituent stored in said second price storage means and said department information constituent stored in said second department storage means.

16. An electronic cash register in accordance with claim 12, which further comprises
means for providing the cumulative total amount of said price information constituent of said plurality of information pieces entered in succession, and
third storage means for storing said cumulative total amount.

17. An electronic cash register in accordance with claim 16, wherein said load indicating providing means is connected to said cumulating means for providing an enabling signal for enabling said cumulating means for adding said price information consituent stored in said first price storage means to said cumulative total amount stored in said third storage means.

18. An electronic cash register in accordance with claim 16, in which said department information constituent comprises a predetermined number of digits, and which further comprises means for counting the number of digits of each said entered department information constituent of said entered information piece for providing an enabling signal for enabling said cumulating means and said transfer means.

19. An electronic cash register in accordance with claim 16, in which said entry means includes means for entering instruction information, for producing a total print signal and said printing means comprises means responsive to said total print signal for printing said total amount stored in said third storage means as said cumulative total amount.

20. An electronic cash register in accordance with claim 15, which further comprises means for automatically providing a print signal for instructing print out of said information stored in said second storage means immediately following the transfer of said information from said first storage means to said second storage means.

21. An electronic cash register in accordance with claim 19 which further comprises means for automatically providing a print signal instructing said printing means to said information stored in said second storage means.

22. An electronic cash register in accordance with claim 21, in which said print signal providing means is connected to receive an output of said power recovery detectng means and is responsive thereto for providing said print signal.

23. An electronic cash register in accordance with claim 17, which further comprises means responsive to an output of said power recovery detecting means for providing a print signal to said printing means.

24. An electronic cash register in accordance with claim 23, in which said print signal providing means provides a print signal for printing out information stored in said second storage means and third storage means.

25. An electronic cash register in accordance with claim 17, which further comprises means for entering instructing information to instruct said printing means to print out said cumulative total amount.

26. An electronic cash register in accordance with claim 25, which further comprises judge means connected to said power recovery determing means and said first department means for determing whether said instructing information is entered wherein said judge means is enabled by said power recovery output signal.

27. An electronic cash register in accordance claim 26, which further comprises means responsive to said entered instructing information for clearing said first department storage means.

28. An electronic cash register in accordance with claim 27, wherein said judge means comprises means coupled to said first department storage means for determining whether said first department storage means has been cleared and producing a corresponding clear or not clear signal.

29. An electronic cash register in accordance with claim 26, wherein said judge means is enabled by said power recovery output signal to produce output signals indicative of whether or not said total instructing information has been entered, and wherein said cash register further comprises means responsive to an output of said judge means for providing a first print signal for printing out said price information constituent stored in said second price storage means and said department information constituent stored in said second department storage means when said total instructing information has not been entered and for providing a second print signal for printing out said cumulative total amount stored in said third storage means when said total instructing information has been entered.

30. An electronic cash register in accordance with claim 26, which further comprises means responsive to an output of said judge means for providing a first print signal for printing out said cumulative total amount stored in said third storage means and said department information constituent stored in said second department storage means when said total instructing information has not been entered and for providing a second print signal for printing out said cumulative total amount stored in said third storage means when said total instructing information has been entered.

31. An electronic cash register in accordance with claim 2, which further comprises means for entering information uniquely identifying an operator.

32. An electronic cash register in accordance with claim 31, in which further comprises
store means responsive to entry of said indentification information to assume a first state and responsive to said power recovery detected output signal to assume a second state, and
means responsive to said first storing state of said store means for enabling said entry means.

33. An electronic cash register in accordance with claim 2, which further comprises means for disabling said power recovery detecting means during a period of time from initiation of said power supply until after entry of information.

34. An electronic cash register in accordance with claim 5, which further comprises means for enabling said power recovery detecting means only for a predetermined period of time.

35. An electronic cash register in accordance with claim 34, in which said predetermined period of time is selected to be a period after obtaining of said transfer signal until the end of printing said stored information by said printing means.

36. An electronic cash register in accordance with claim 2, which further comprises
means for storing information identifying the print out immediately after power recovery, and
means responsive to the output of said power recovery detecting means for printing out said information identifying the print out after power recovery.

* * * * *

UNITED STATES PATENT AND TRADEMARK OFFICE
CERTIFICATE OF CORRECTION

PATENT NO. : 4,003,030
DATED : January 11, 1977
INVENTOR(S) : Haruo Takagi et al It is certified that error appears in the above-identified patent and that said Letters Patent are hereby corrected as shown below:

```
Column 4, line 34, after "corresponding" insert --to--.*
Column 7, line 17, "when" should be --When--.
Column 8, line 37, "become the" should be --go to a--.
Column 9, line 1, "their" should be --then--.*
Column 9, line 3, "2" should be --02--.
Column 9, line 7, "dpare" should be --dp are--.
Column 9, line 30, "abovedescribed" should be --above
    described--.
Column 14, line 62, after "the" (first occurrence) insert
    --OR gate 24, the total/department code from the--.
Column 15, line 20, "coincided" should be --coincident--.
Column 17, line 34, "asterick" should be --asterisk--.*
```

Signed and Sealed this

Nineteenth Day of April 1977

[SEAL]

Attest:

RUTH C. MASON
Attesting Officer

C. MARSHALL DANN
Commissioner of Patents and Trademarks